United States Patent

Takita et al.

[11] Patent Number: 5,291,351
[45] Date of Patent: Mar. 1, 1994

[54] MAGNETIC RECORDING/REPRODUCING APPARATUS

[75] Inventors: Kouhei Takita; Yoshiyuki Tanaka; Hironori Saitoh, all of Katsuta; Kyuichirou Nagai, Fujisawa; Tatsumi Nishijima, Katsuta; Kenji Ogiro; Nobuo Masuoka, both of Yokohama; Kenji Fuse, Yokosuka, all of Japan

[73] Assignee: Hitachi, Ltd., Tokyo, Japan

[21] Appl. No.: 788,317

[22] Filed: Nov. 5, 1991

[30] Foreign Application Priority Data

Nov. 9, 1990 [JP] Japan .................. 2-302369

[51] Int. Cl.⁵ .................. G11B 5/027; G11B 5/008
[52] U.S. Cl. .................. 360/85; 360/95
[58] Field of Search .................. 360/85, 95

[56] References Cited

U.S. PATENT DOCUMENTS

| | | | |
|---|---|---|---|
| 4,410,919 | 10/1983 | Umeda | 360/85 |
| 4,685,008 | 8/1987 | Ohyama | 360/85 |
| 4,796,115 | 1/1989 | Ohshima et al. | 360/85 |
| 4,814,910 | 3/1989 | Kaku et al. | 360/85 |
| 4,918,551 | 4/1990 | Yoshida et al. | 360/96.5 |
| 4,985,789 | 1/1991 | Kodama et al. | 360/85 |
| 5,025,331 | 6/1991 | Hirayama et al. | 360/85 |
| 5,126,909 | 6/1992 | Mototake et al. | 360/137 |

Primary Examiner—Stuart S. Levy
Assistant Examiner—David D. Davis
Attorney, Agent, or Firm—Antoneli, Terry, Stout & Kraus

[57] ABSTRACT

A magnetic recording/reproducing apparatus comprises a main chassis on which a cylinder having a rotary magnetic head attached thereto is mounted, a subchassis which is supported on the main chassis so as to be movable toward and away from the cylinder and on which reel mounts are mounted for engagement with reels of a magnetic tape cassette, a driving motor, tape guide members serving to form a predetermined path through which a magnetic tape moves so as to be wound around the cylinder, a pinch roller which cooperates with a capstan to hold the magnetic tape therebetween so as to move the magnetic tape in a predetermined direction, brakes for applying predetermined rotational loads to the reel mounts, operation members for operating the pinch roller and/or brakes, cam members for imparting a predetermined displacement to the operation members, and transmission members for transmitting the driving force from the driving motor to the cam members, wherein at least the driving motor, the brake members, as well as the transmission members, cam members and operation members which are associated with the brake members, respectively, are mounted on the subchassis.

2 Claims, 6 Drawing Sheets

MAGNETIC RECORDING/REPRODUCING APPARATUS

BACKGROUND OF THE INVENTION

This invention relates to a magnetic recording/reproducing apparatus, and more particularly, to a magnetic recording/reproducing apparatus which has a double chassis structure.

In order to reduce the size of the apparatus, there has been proposed a magnetic tape recording/reproducing apparatus which has a double chassis structure consisting of a main chassis on which a cylinder having a rotary magnetic head attached thereto is disposed and a subchassis which is guided and supported on the main chassis so as to be movable toward and away from the cylinder with carrying a magnetic tape cassette, as disclosed in Japanese Patent Unexamined Publication No. 2-62748, for example. In this kind of apparatus, there are mounted on the main chassis, in addition to the cylinder, parts including a capstan, cam members, a driving motor for operating or driving the cam members and the like, while there are mounted on the subchassis parts including reel mounts on which reels of the magnetic tape cassette are to be fitted, brake members for applying predetermined rotational loads to the reel mounts, a pinch roller and the like. Transmission members for transmitting the driving force of the driving motor to the parts and operation members which receive the driving force and serve to make the parts such as the brake members and the pinch roller operate are disposed so as to connect between the main chassis and the subchassis.

The magnetic recording/reproducing apparatus of the above construction is disadvantageous in that the construction of the transmission and operation members used for transmitting the driving force from the driving motor mounted on the main chassis to the parts mounted on the subchassis, particularly to the brake members, becomes complicated.

Further, if the parts to be mounted are reduced in size and the main chassis and the subchassis are made thinner for the purpose of decreasing the thickness of the magnetic recording/reproducing apparatus, the main chassis and/or the subchassis is suffered from elastic deformation, upon loading or modes operation, due to pressing forces of the brake members, pinch roller, tape guide members and the like against their mating members, resulting in the problem relating to the reliability of operation such that joints between the mounted parts are disconnected or engagements between the mounted parts become irregular so as to hinder the smooth cooperation between the mounted parts.

An object of the present invention is to provide a thinner small-sized magnetic recording/reproducing apparatus which is simpler in construction and has a high reliability of operation.

SUMMARY OF THE INVENTION

A magnetic recording/reproducing apparatus according to the present invention comprises a main chassis on which a cylinder having a rotary magnetic head attached thereto is mounted, a subchassis which is supported on the main chassis so as to be movable toward and away from the cylinder and on which reel mounts are mounted for engagement with reels of a magnetic tape cassette, a driving motor, tape guide members serving to form a predetermined path through which the magnetic tape moves so as to be wound around the cylinder, a pinch roller which cooperates with a capstan to hold the magnetic tape therebetween so as to move the magnetic tape in a predetermined direction, brake members for applying predetermined rotational loads to the reel mounts, operation members for operating the pinch roller and/or brake members, cam members for imparting a predetermined displacement to the operation members, and transmission members for transmitting the driving force from the driving motor to the cam members, wherein at least the driving motor, brake members as well as transmission members, cam members and operation members which are associated with the brake members, respectively, are mounted on the subchassis.

The pinch roller and the transmission member, cam member and operation member which are associated with the pinch roller may be mounted on the subchassis.

Further, it is preferred that the main chassis is formed with a notched portion so that part of the component parts mounted on the subchassis, or the component parts mounted on a surface of the subchassis adjacent to the main chassis are loose-fitted in the notched portions.

BRIEF DESCRIPTION OF THE DRAWINGS

FIGS. 1 to 6 show a magnetic recording/reproducing apparatus according to a first embodiment of the present invention, in which:

FIG. 1 is a plan view of the magnetic recording/reproducing apparatus in a state where unloading has been completed;

FIG. 2 is a side view of the same apparatus as seen from the direction of an arrow A of FIG. 1;

FIG. 3 is a plan view of the magnetic recording/reproducing apparatus in a state where loading has been completed;

FIG. 4 is a side view of the same apparatus as seen from the direction of an arrow B of FIG. 3;

FIG. 5 is a bottom view of a subchassis; and

FIG. 6 is a plan view of a main chassis, and

DESCRIPTION OF THE PREFERRED EMBODIMENTS

Description will be given below of a magnetic recording/reproducing apparatus according to a first embodiment of the present invention with reference to FIGS. 1 to 6.

Figure 6:
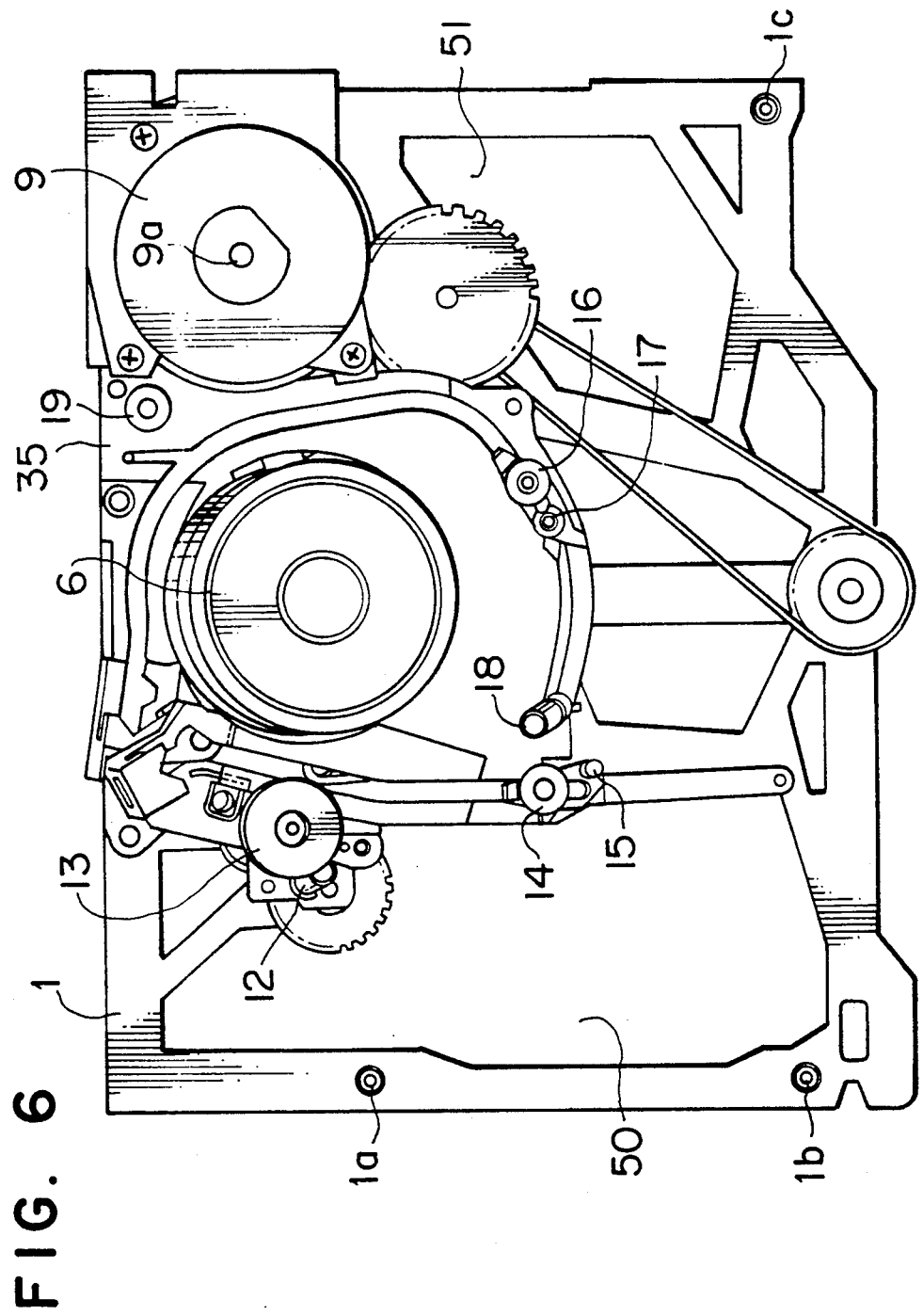

As shown in FIG. 6, there are mounted on a main chassis 1 a cylinder 6 having a magnetic head (not shown), a capstan 9a, a capstan motor 9, and tape guide members 12, 13, 14, 15, 16, 17, 18 and 19 along which a magnetic tape 7 is pulled out of a magnetic tape cassette 3 so as to be wound around the cylinder 6.

A subchassis 2 is formed therein with slots 2a, 2b and 2c which extend in the depthwise direction. These slots 2a, 2b and 2c are made to engage with guide pins 1a, 1b and 1c stood on the main chassis 1, respectively, so that the subchassis 2 is supported on the main chassis 1 so as to be movable toward and away from the cylinder 6.

There are mounted on the upper surface of the subchassis 2 a driving motor 8 serving as a source of the driving force for changing modes of operation, a supply reel mount 4 and a take-up reel mount 5 which are to be engaged with a supply reel and a take-up reel of the magnetic tape cassette 3, respectively, a first brake member 37 for applying the rotational load to the supply reel mount 4 in accordance with the modes, a first operation member 38 for operating the first brake member 37, a second brake member 39 for keeping the supply reel mount 4 in its locked condition, a pinch roller 20, and a third operation member 36 for operating the pinch roller 20.

Figure 1:
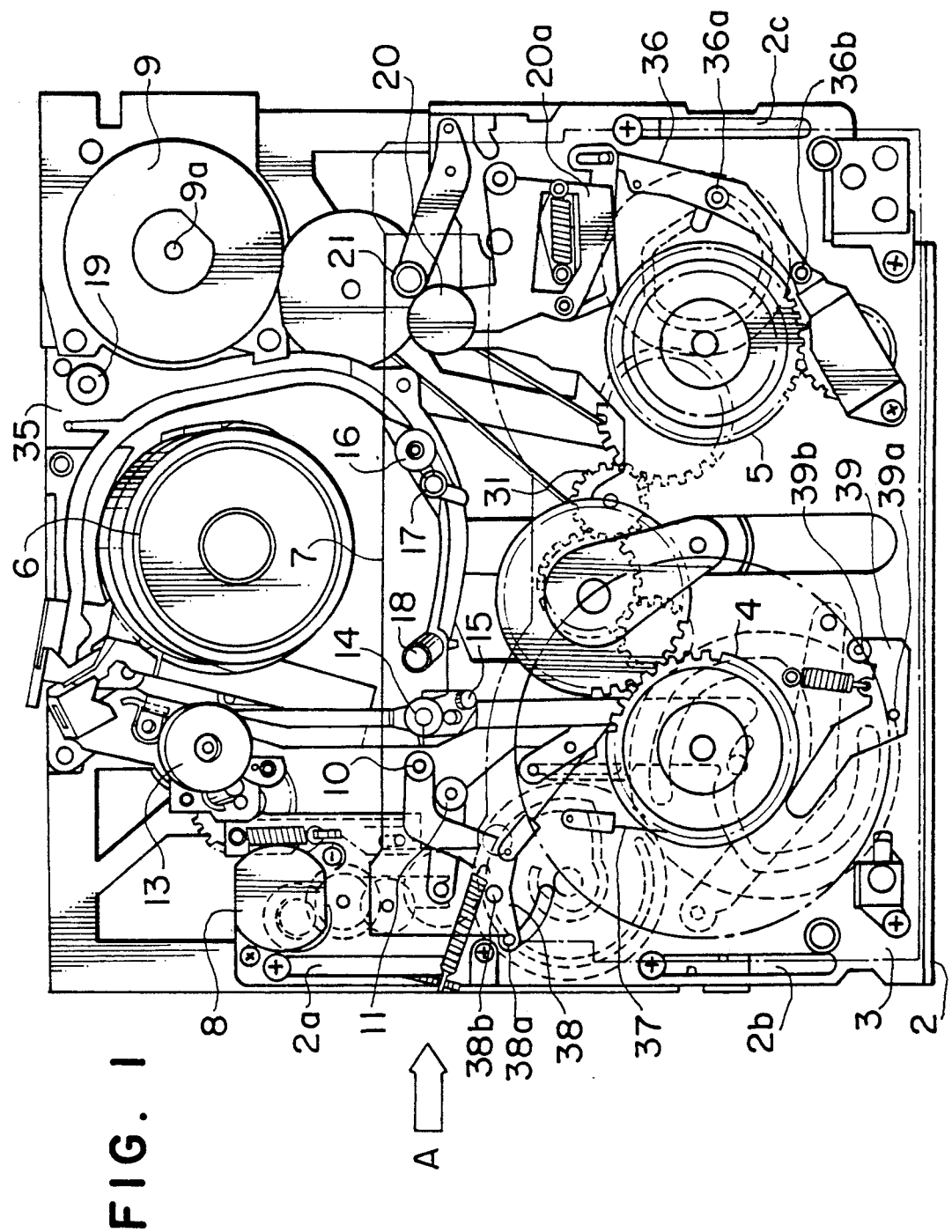
Figure 2:
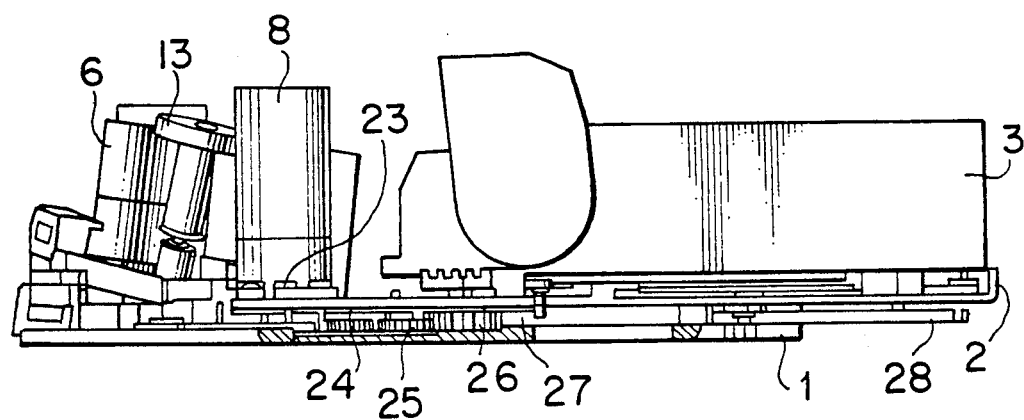
Figure 4:
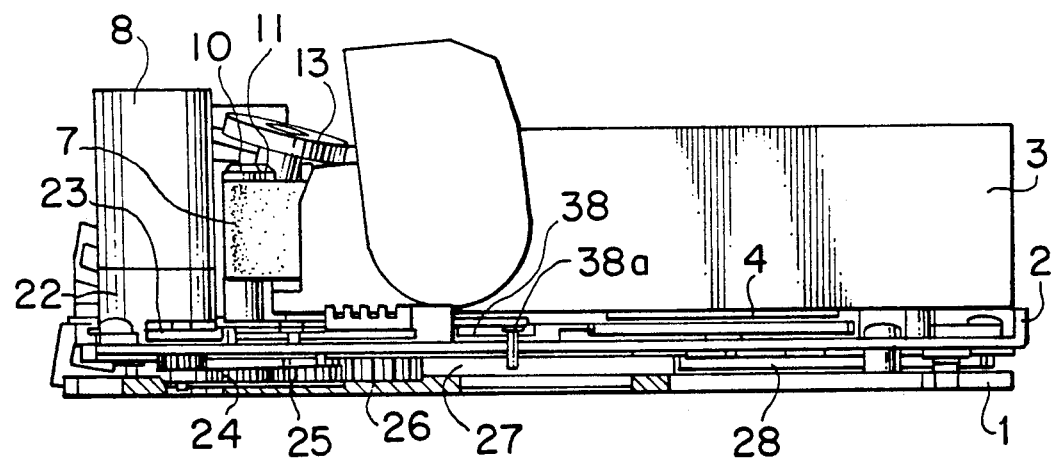
Figure 3:
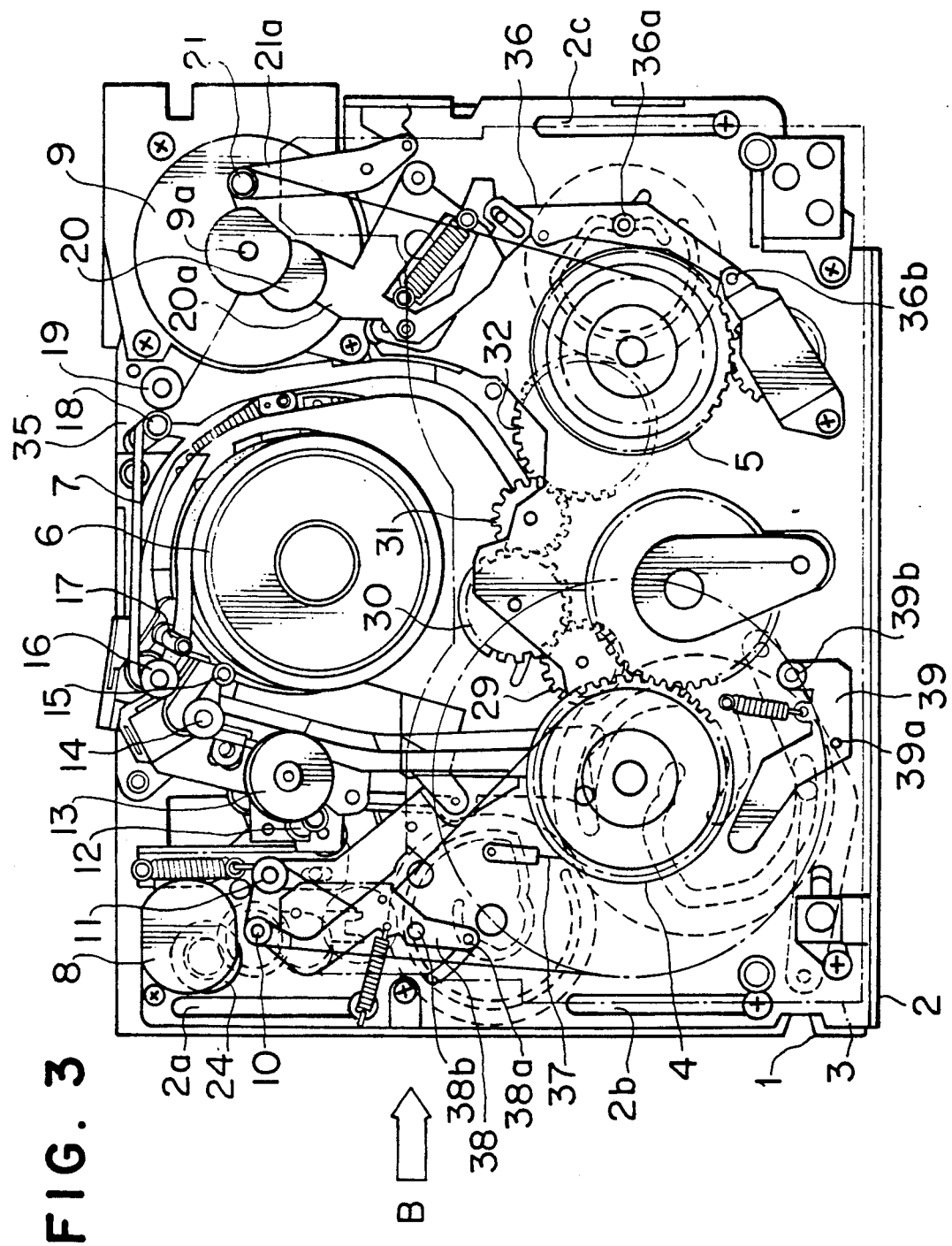
Figure 5:
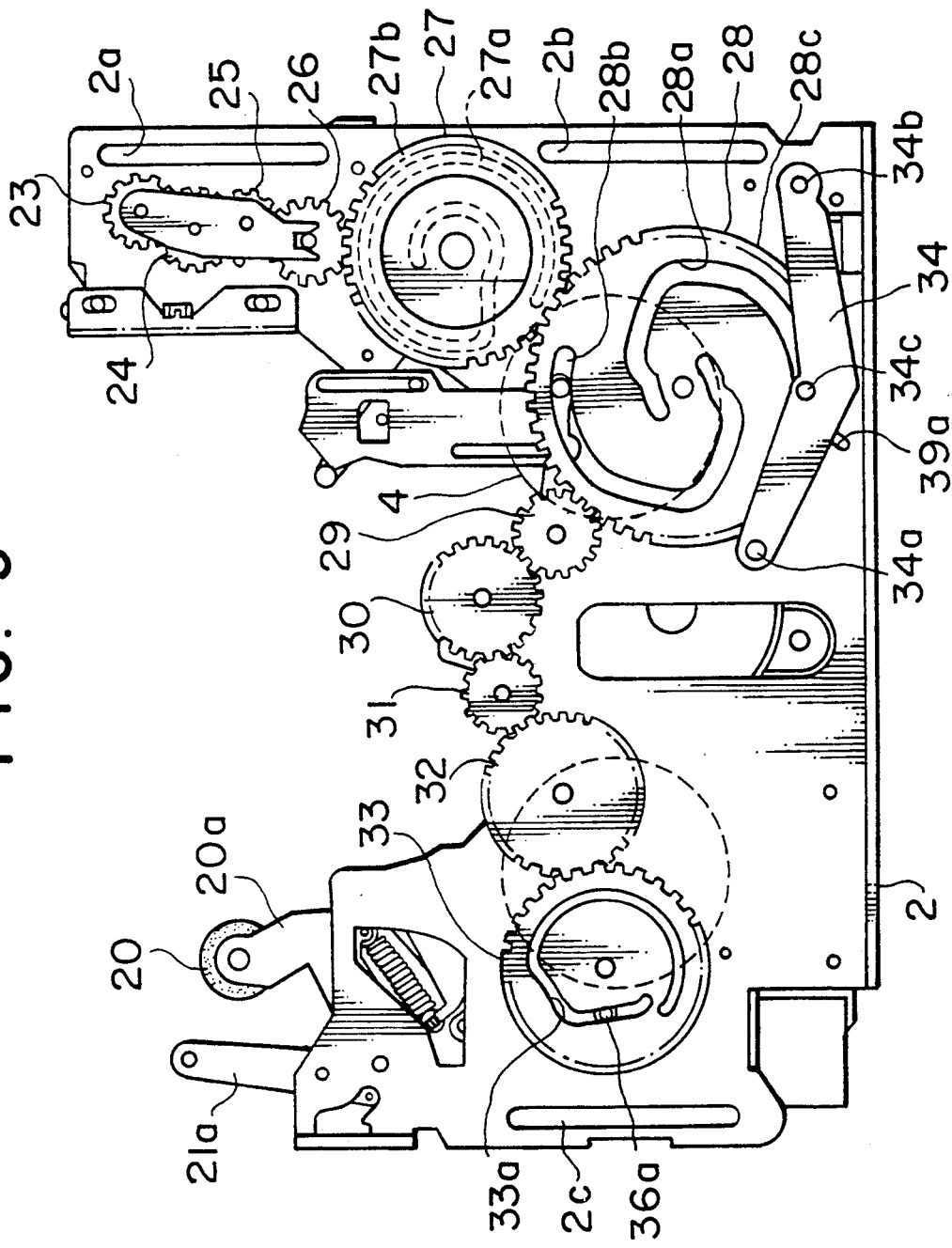

As shown in FIG. 5, there are mounted on the back of the subchassis 2, that is, on the side thereof facing to the main chassis 1, a first gear train 23, 24, 25 and 26, a first cam 27 serving to mesh with the gear 26 of the first gear train, a second cam 28 serving to mesh with a gear 27b formed in the peripheral surface of the first cam, a second gear train 29, 30, 31 and 32 serving to mesh with a gear 28c formed in the peripheral surface of the second cam 28, a third cam 33 serving to mesh with the gear 32 of the second gear train, and a second operation member 34 for controlling the movement of the subchassis 2 and the operation of the second brake member 39.

The first operation member 38 is rotatably mounted on the subchassis 2 by means of a shaft 38b and is provided with a pin 38a stood at one end thereof while being connected with the first brake member 37 at the other end thereof. The pin 38a extends through the subchassis 2 so as to be brought into engagement with a grooved cam 27a formed in the first cam 27.

The second operation member 34 is rotatably mounted on the subchassis 2 by means of a shaft 34a and is provided at one end thereof with a pin 34b stood at the other end thereof. Further, a pin 34c is stood on the second operation member 34 between the shaft 34a and the pin 34b. The pin 34c is brought into engagement with a grooved cam 28a formed in the second cam 28. On the other hand, the pin 34b is brought into engagement with the main chassis 1.

The second brake member 39 is rotatably mounted on the subchassis 2 by means of a shaft 39b and is provided at one end thereof with a pin 39a stood at a middle point thereof. The pin 39a extends through the subchassis 2 so as to be brought into engagement with the side face of the second operation member 34. The other end of the second brake member 39 is located so as to be engageable with the supply reel mount 4.

The third operation member 36 is rotatably mounted on the subchassis 2 by means of a shaft 36b and is provided at one end thereof with a pin 36a stood at a middle point thereof. The pin 36a extends through the subchassis 2 so as to be brought into engagement with a grooved cam 33a formed in the third cam 33. The third operation member 36 is provided at the other end thereof with the pinch roller 20 through an intermediate member 20a.

First and second notches 50 and 51 are formed in the main chassis 1 so that the component parts mounted on the back of the subchassis 2, that is, the first gear train 23, 24, 25 and 26, the first cam 27 and the second cam 28 are loose-fitted partially in the first notch 50 and the third cam 33 is loose-fitted partially in the second notch 51.

Next, operation will be described.

As the magnetic tape cassette 3 is put on the subchassis 2, a switch (not shown) makes the driving motor 8 operate so as to transmit the rotation of the driving motor 8 mounted on the subchassis 2 to the first cam 27 mounted on the subchassis 2 through the first gear train 23, 24, 25 and 26 mounted on the subchassis 2 as well.

Further, this rotation is to be transmitted through the second cam 28 and the second gear train 29, 30, 31 and 32 mounted on the subchassis 2 to the third cam 33 mounted on the subchassis 2 likewise.

As the second cam 28 is rotated, the second operation member 34 mounted on the subchassis 2 is caused to turn by the action of the grooved cam 28a of the second cam 28 so as to move the subchassis 2 toward the cylinder 6. At the same time, the second brake member 39 mounted on the subchassis 2 is caused to turn so as to release the supply reel mount 4 from its locked condition (see FIG. 3).

The driving force produced by the driving motor 8 is to be transmitted through a transmission mechanism (not shown) to the tape guide members 10, 11, 12, 13, 14, 15, 16, 17, 18, 19 and 21 so that the tape guide members move through the predetermined path so as to draw the magnetic tape 7 out of the cassette 3 and wind it around the cylinder 6.

As the third cam 33 is rotated, the third operation member 36 is made to turn by the action of the grooved cam 33a of the third cam 33. The third operation member 36 serves to urge the pinch roller 20 against the capstan 9a so that the magnetic tape 7 is held between the pinch roller 20 and the capstan 9a.

As the first cam 27 mounted on the subchassis 2 is rotated, the first operation member 38 is made to turn about the shaft 38b by the action of the grooved cam 27a of the first cam 27. The first operation member 38 mounted on the subchassis 2 causes the first brake member 37 mounted on the subchassis 2 as well to operate so as to apply the predetermined rotational loads to the supply reel mount 4 in accordance with the modes of operation including fast forward, playback and the like.

As described above, in the present embodiment, the driving motor 8, the first brake member 37, the second brake member 39, the pinch roller 20, the transmission members for transmitting the rotational force of the driving motor 8 and the operation members for operating them are mounted concentratedly on the subchassis 2, and therefore, engagements among the component parts are completed on the subchassis 2. In consequence, there is no possibility that the engagement between the component parts is broken and the smooth operation is hindered due to deformation of the main chassis 1 and/or the subchassis 2, with the result that it is possible to obtain a magnetic recording/reproducing apparatus which can operate with high reliability. Further, since the component parts can be engaged with each other surely or solidly, the component parts, the main chassis 1 and the subchassis 2 can be made thinner.

In addition, since there are mounted on the main chassis 1 only the cylinder 6, the capstan motor 9, the tape guide members 12, 13, 14, 15, 16, 17, 18 and 19 and so on as shown in FIG. 6, it is possible to form the notches 50 and 51 in the main chassis 1. This makes it possible to reduce the weight of the magnetic recording/reproducing apparatus. Moreover, by loose-fitting the component parts mounted on the back of the subchassis 2 within the notches, that is, by loose-fitting the first gear train 23, 24, 25 and 26, the first cam 27 and the second cam 28 partially in the first notch 50 and by loose-fitting the third cam 33 partially in the second notch 51, the thickness of the magnetic recording/reproducing apparatus can be reduced. Still moreover, it is possible to easily perform the maintenance such as to check by visual observation the operating conditions of all the component parts located between the main chassis 1 and the subchassis 2, lubricate, exchange the parts and the like. Comparing the magnetic recording/reproducing apparatus of the present embodiment with the conventional one, the weight of the chassis can be reduced from 25g to 12g and the number of component parts can be decreased from 194 to 160.

Figure 7:
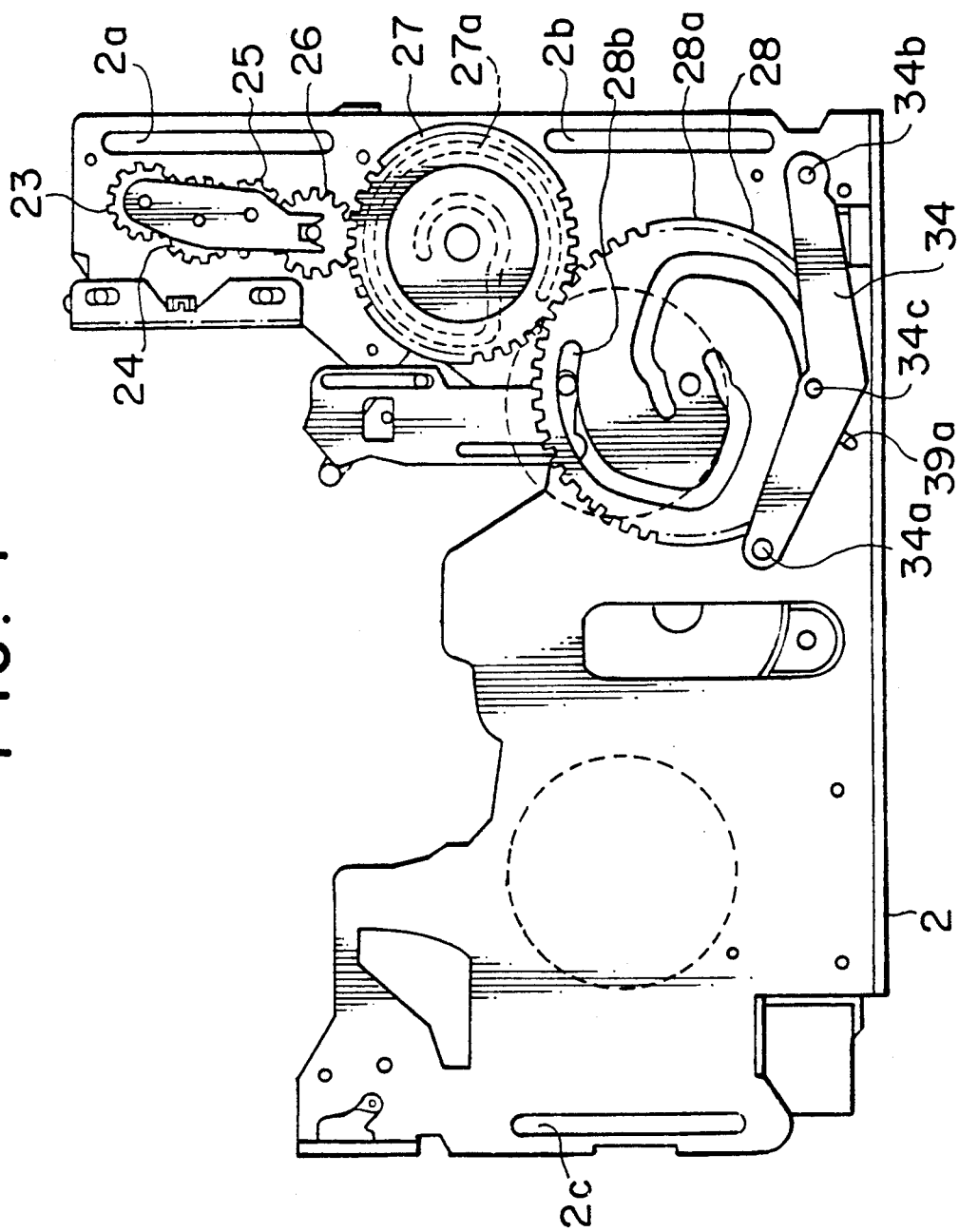
FIG. 7 is a bottom view similar to FIG. 5 but showing the subchassis of a magnetic recording/reproducing apparatus according to a second embodiment of the invention.

Next, description will be given of a magnetic recording/reproducing apparatus according to a second embodiment of the invention with reference to FIG. 7.

A point of difference from the first embodiment is that the pinch roller 20 and the parts associated therewith including the second gear train 29, 30, 31 and 32, the third cam 33 and the like are not mounted on the back of the subchassis 2. In other words, in the second embodiment, only the driving motor 8, the first and second brake members 37 and 39, and the parts for operatively connecting them with each other are mounted concentratedly on the subchassis 2.

This construction is inferior to that of the first embodiment in terms of simplification of the structure and reduction in the thickness of the apparatus, and however, since the operative connection from the driving motor 8 to the brake members 37 and 39, which is the most complicated and hence has much effects on the reliability of operation of the apparatus, can be completed on the subchassis 2, it is possible to make the construction simpler as well as to obtain a higher reliability of operation as compared with the conventional magnetic recording/reproducing apparatus.

What is claimed is:

1. A magnetic recording/reproducing apparatus comprising:

a main chassis on which a cylinder having a rotary magnetic head attached thereto is mounted;

a subchassis which is supported on said main chassis so as to movable toward and away from said cylinder and on which reel mounts are mounted for engagement with reels of a magnetic tape cassette;

a driving motor;

tape guide members serving to form a predetermined path through which a magnetic tape moves so as to be wound around said cylinder;

a pinch roller which cooperates with a capstan to hold the magnetic tape therebetween so as to move the magnetic tape in a predetermined direction;

brake members for applying predetermined rotational loads to said reel mounts;

operation members for operating said pinch roller and/or brake members;

cam members for imparting a predetermined displacement to said operation members; and transmission members for transmitting the driving force from said driving motor to said cam members, wherein at least said driving motor, said brake members, as well as the transmission members, cam members and operation members which are associated with said brake members, respectively, are mounted on said subchassis, and wherein said pinch roller and the transmission member, cam member and operation member which are associated with said pinch roller, respectively, are mounted on said subchassis.

2. A magnetic recording/reproducing apparatus according to claim 1, wherein said main chassis is formed with notched portions and component parts mounted on a surface of said subchassis adjacent to the main chassis are loose-fitted in said notched portions.

* * * * *